(12) United States Patent
Yanagisawa et al.

(10) Patent No.: US 10,644,413 B2
(45) Date of Patent: May 5, 2020

(54) METHOD FOR JOINING ELECTRICAL CONDUCTORS

(71) Applicant: HONDA MOTOR CO., LTD., Tokyo (JP)

(72) Inventors: Takeshi Yanagisawa, Tochigi (JP); Kenichiro Murata, Tochigi (JP); Akifumi Sudo, Tochigi (JP); Kazuhito Hiraga, Tochigi (JP); Junya Tachikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 339 days.

(21) Appl. No.: 15/837,197

(22) Filed: Dec. 11, 2017

(65) Prior Publication Data

US 2018/0166796 A1      Jun. 14, 2018

(30) Foreign Application Priority Data

Dec. 13, 2016   (JP) .................................. 2016-241130

(51) Int. Cl.
*H02K 15/00* (2006.01)
*H02K 3/50* (2006.01)
(Continued)

(52) U.S. Cl.
CPC ............. *H01R 4/021* (2013.01); *B23K 9/164* (2013.01); *B23K 9/167* (2013.01); *B23K 9/23* (2013.01);
(Continued)

(58) Field of Classification Search
CPC ...... H02K 15/0081; H02K 15/00; H02K 3/50; H02K 3/04; H02K 15/04; H02K 3/00;
(Continued)

(56) References Cited

U.S. PATENT DOCUMENTS 8,921,696 B2 * 12/2014 Otsuka .................. H01R 4/021
174/74 R

FOREIGN PATENT DOCUMENTS

| JP | 2006-025544 | 1/2006 |
| JP | 2014-107876 | 6/2014 |
| JP | 2016-189657 | 11/2016 |

OTHER PUBLICATIONS

Japanese Office Action dated Jun. 5, 2018, 2 pages.

* cited by examiner

*Primary Examiner* — David J Walczak
(74) *Attorney, Agent, or Firm* — Rankin, Hill & Clark LLP

(57) ABSTRACT

A method for joining segments (electrical conductors) includes first and second joining steps. The first joining step includes welding a group of the segments including ends, such that the first group is welded to pairs of electrical conductors. The second joining step includes welding a second group of the segments including ends, which are composed of the segments whose ends are arranged in a column in the radial direction, such that the second group is welded to pairs of electrical conductors. The first group includes a segment as a first electrical conductor including the end which is located at the middle portion of a group of the segments including the ends in the radial direction. The second group includes a segment as a second electrical conductor including the end which crosses the first electrical conductor on the opposite sides with respect to the middle portion in the radial direction.

2 Claims, 5 Drawing Sheets

(51) Int. Cl.
*H02K 3/04* (2006.01)
*H02K 15/04* (2006.01)
*H01R 4/02* (2006.01)
*H01R 43/02* (2006.01)
*B23K 9/167* (2006.01)
*B23K 9/16* (2006.01)
*B23K 9/23* (2006.01)
*B23K 101/38* (2006.01)
*B23K 103/12* (2006.01)
*B23K 101/32* (2006.01)

(52) U.S. Cl.
CPC ............ *H01R 43/0263* (2013.01); *H02K 3/04* (2013.01); *H02K 3/50* (2013.01); *H02K 15/00* (2013.01); *H02K 15/0081* (2013.01); *H02K 15/04* (2013.01); *B23K 2101/32* (2018.08); *B23K 2101/38* (2018.08); *B23K 2103/12* (2018.08)

(58) Field of Classification Search
CPC ........... H02K 15/0068; H02K 15/0075; H02K 3/505; B23K 9/167; B23K 9/164; B23K 9/23; B23K 2101/38; B23K 2103/12; B23K 2101/32; B23K 9/1675; B23K 9/235; H01R 4/021; H01R 43/0263; H01R 4/023; H01R 4/026
See application file for complete search history.

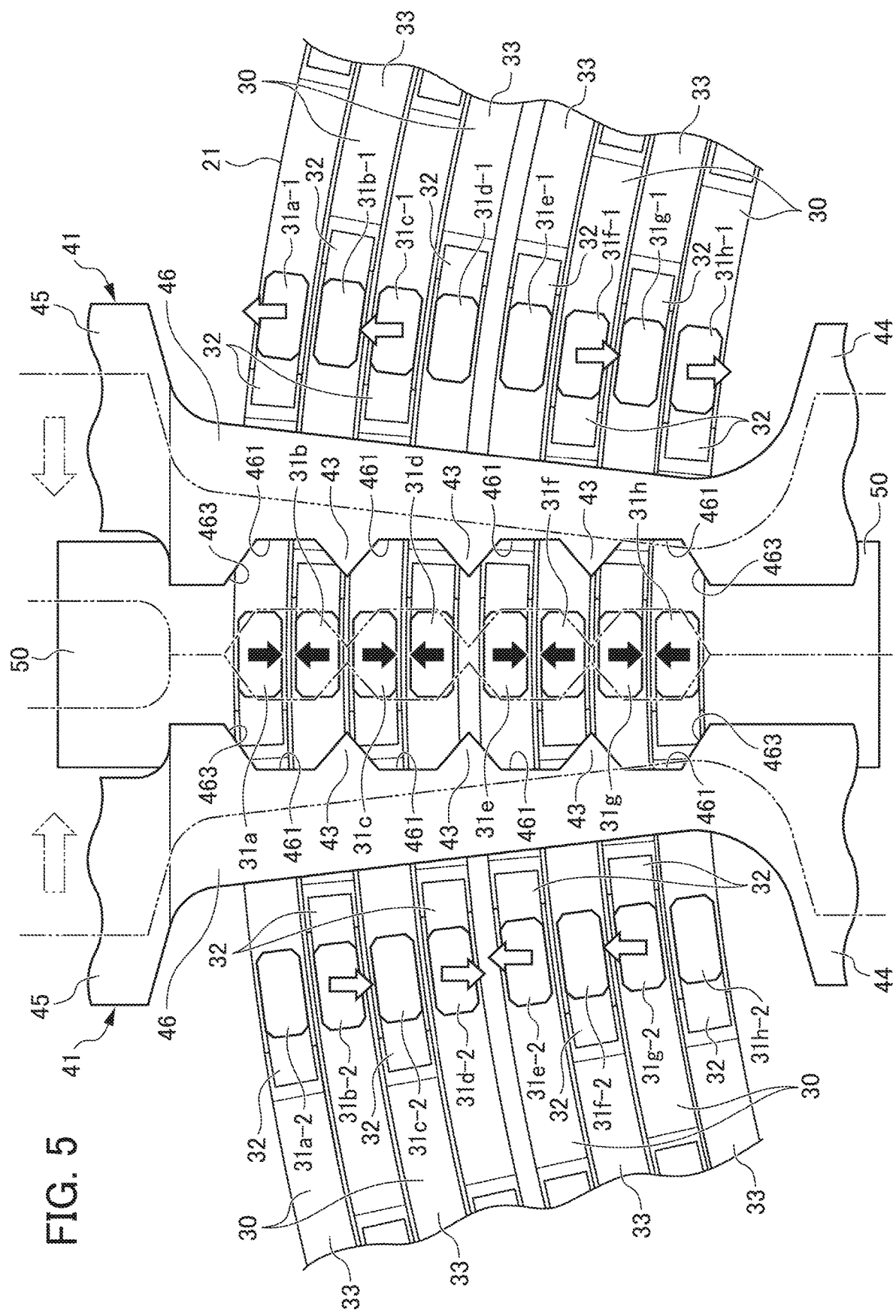

METHOD FOR JOINING ELECTRICAL CONDUCTORS

This application is based on and claims the benefit of priority from Japanese Patent Application No. 2016-241130, filed on 13 Dec. 2016, the content of which is incorporated herein by reference.

BACKGROUND OF THE INVENTION

Field of the Invention

The present invention relates to a method for joining electrical conductors.

Related Art

Conventionally, electrical conductors have been joined through welding ends of the electrical conductors, the ends protruding from slots of a core which is used in a revolving armature and the like. With regard to such a technique, there are Japanese Unexamined Patent Application Publications No. 2014-107876 and No. 2006-25544. JP2014-107876 discloses a technique in which ends of segments (electrical conductors) are clamped with a clamp tool and welded. JP2006-25544 discloses a technique in which ends of a plurality of electrical conductors which are arranged in a column in a radial direction are welded while one of the ends which is located radially inner is pressed radially outward and the other of the ends which is located radially outer is pressed radially inward.

SUMMARY OF THE INVENTION

A pair of electrical conductors to be welded adjacent to each other in a radial direction are welded in a state in which the pair has been moved to be close to each other in a welding operation. In this operation, it may occur that some electrical conductors, which are adjacent in a circumferential direction to other electrical conductors to be welded, move towards a middle portion in the radial direction. It may lead to a joining defect due to inappropriate clamping if the electrical conductors move outside a range of clamping achievable by the clamp tool. In addition, there may be a risk that strong force is required to correct positions of the electrical conductors or contact friction due to the clamp tool causes damage to the electrical conductors, even if the electrical conductors move within the range of clamping achievable by the clamp tool. In this regard, the technique disclosed in JP2006-25544 has not been free of a similar drawback, since it is difficult to sufficiently transfer pressing force applied by an electrode as far as electrical conductors which are located at a middle portion in a radial direction, though a joint position can be corrected by the pressing force applied by the electrode on both inner and outer sides in the radial direction.

The present invention provides a method for joining electrical conductors by which it is possible to prevent the electrical conductors, which are located at the middle portion in the radial direction and positions of which are not easily correctable by pressing from outside, from being dislocated from an appropriate joining position.

The present invention relates to a method for joining a plurality of electrical conductors (e.g. segments 30 to be described later) which are inserted in a plurality of slots (e.g. slots 22 to be described later) provided at a core (e.g. a stator core 21 to be described later) and which are twisted. Two of the electrical conductors, whose ends are adjacent to each other in a radial direction of the core and which extend in a circumferential direction of the core from two of the slots different from each other, are joined as a pair of electrical conductors by welding while the two of the electrical conductors are pressed from both sides in the radial direction. The method comprises a first joining step and a second joining step which is subsequent to the first joining step. The first joining step includes welding a first group of the electrical conductors (e.g. a group of the segments 30 including ends 31a to 31h to be described later) whose ends (e.g. ends 31 to be described later) are arranged in a column in the radial direction, such that the first group of the electrical conductors are welded to pairs of electrical conductors. The second joining step includes welding a second group of the electrical conductors (e.g. a group of the segments 30 including ends 31a-1 to 31h-1 to be described later) whose ends are arranged in a column in the radial direction, such that the second group of the electrical conductors are welded to pairs of electrical conductors. The first group includes first electrical conductors (e.g. segments 30 including ends 31d and 31e to be described later) which are located at a middle portion of the first group with respect to the radial direction. The second group includes second electrical conductors (e.g. segments 30 including ends 31c-1 and 31f-1 to be described later) which cross the first electrical conductors on opposite sides with respect to the middle portion.

In this manner, the method prevents the second electrical conductors which cross the first electrical conductors from moving towards the middle portion in the radial direction, even if the first electrical conductors located at the middle portion of the first group of the electrical conductors move during the welding operation. It is possible for the method to prevent efficiently a joining defect from occurring, which is caused by the dislocation of the electrical conductors, which are located at the middle portion in the radial direction, from joining positions (clamp positions), since it is possible to restrict shifting of the ends of the electrical conductors located at the middle portion for which it is difficult to perform positional corrections by pressing from outside.

The two electrical conductors constituting the pair of electrical conductors are configured to extend to be close to each other as far as a joining position from locations apart from each other in the circumferential direction. The second group includes the second electrical conductors which cross the first electrical conductors (e.g. segments 30 including ends 31b, 31d, 31e and 31g to be described later) on the opposite sides with respect to the middle portion in the radial direction, the first electrical conductors being located at the middle portion with respect to the radial direction among the pairs of electrical conductors constituting the first group of the electrical conductors.

In this manner, it is possible for the method to prevent securely the ends of the electrical conductors from being dislocated from the joining positions towards the middle portion in the radial direction also for a case in which extending directions of the electrical conductors are configured to be alternately different.

It is possible for the method of joining electrical conductors of the present invention to efficiently prevent the electrical conductors, which are located at the middle portion in the radial direction and for which it is difficult to correct the positions thereof by pressing from outside, from being dislocated from appropriate joining positions.

BRIEF DESCRIPTION OF THE DRAWINGS

FIG. 5 is a plan view illustrating movements of the segments when welding according to the embodiment is performed.

DETAILED DESCRIPTION OF THE INVENTION

Figure 1:
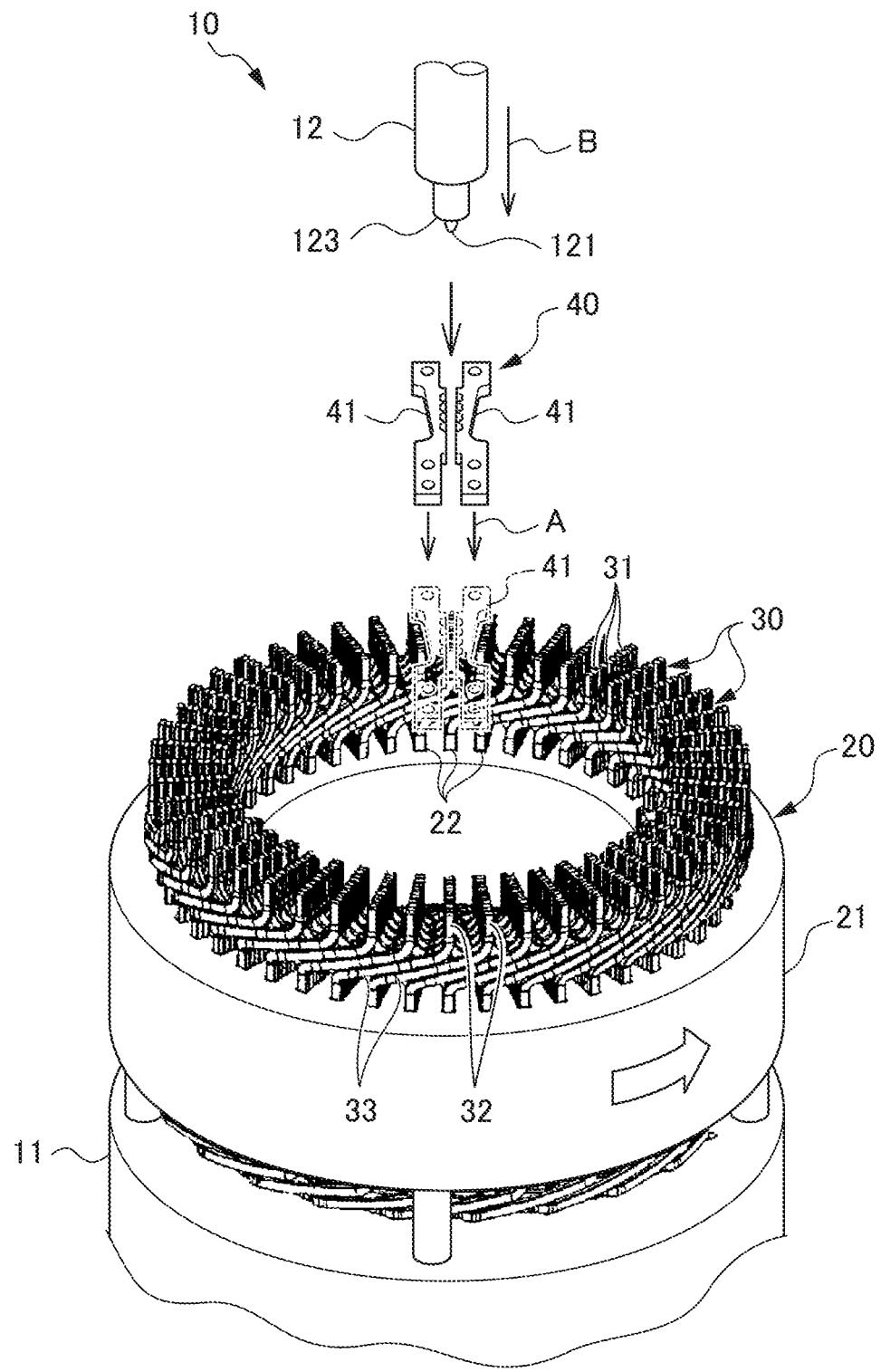
FIG. 1 illustrates a welding device to which a method for joining electrical conductors according to an embodiment is applied.

Descriptions will now be given of an embodiment of the present invention referring to drawings. FIG. 1 illustrates a welding device 10 to which a method for joining electrical conductors according to the embodiment is applied.

A stator 20 which includes segments 30 as electrical conductors to be welded is described first. The stator 20 includes a stator core 21, a plurality of slots 22 and the plurality of segments 30.

The stator core 21 is configured to be cylindrical. The plurality of slots 22 are formed at the stator core 21. The slots 22 are composed of through holes which penetrate the stator core 21 in an axial direction of the stator core 21 and plurally formed entirely in a circumferential direction of the stator core 21. The slots 22 are formed radially and circumferentially with respect to an axial center of the stator core 21. The segments 30 are inserted in the slots 22, respectively.

Figure 2:
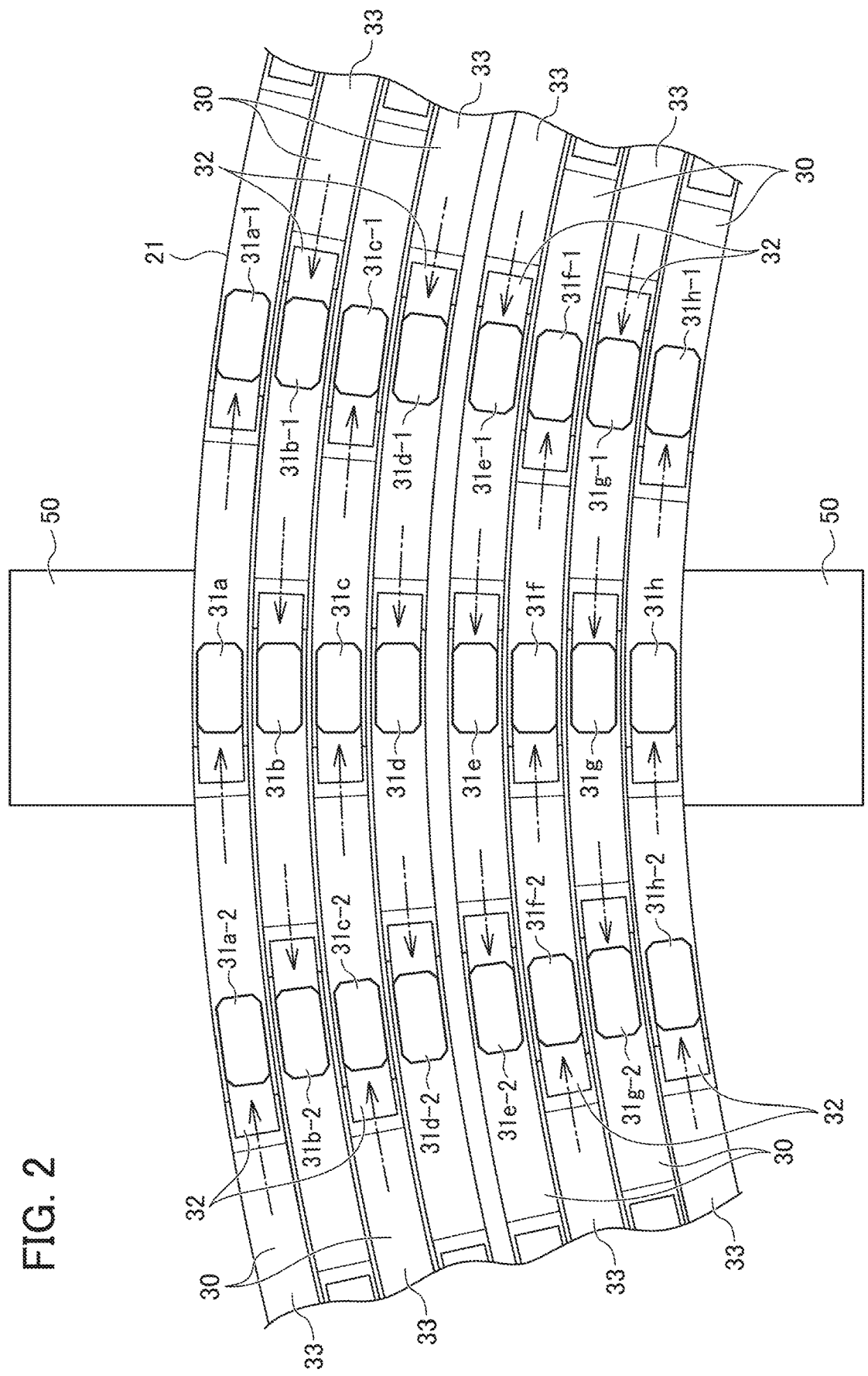
FIG. 2 illustrates a plan view for a positional relation of segments which are inserted in slots of a stator core according to the embodiment.
Figure 3:
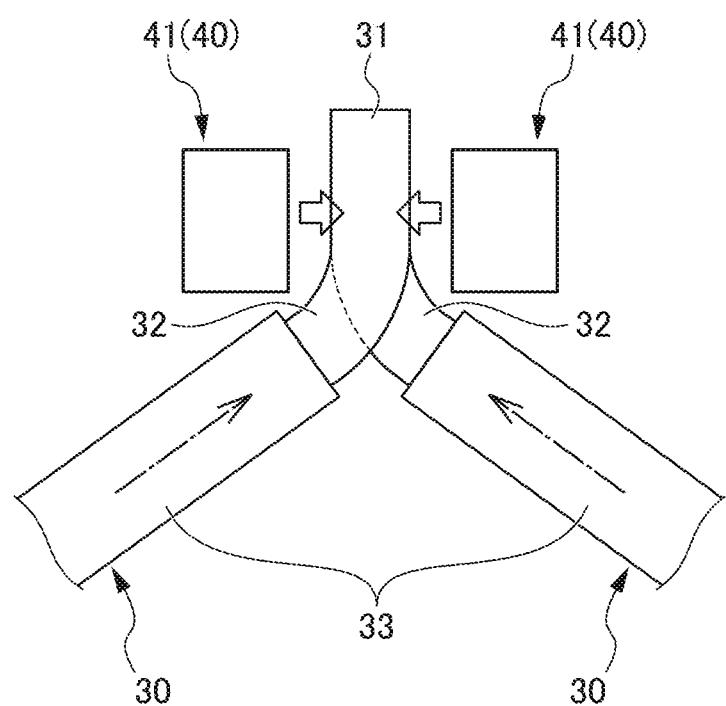
FIG. 3 illustrates ends of the segments overlapping with each other in a radial direction of a core according to the embodiment, when viewed in the radial direction.

The segments 30 will now be described. FIG. 2 illustrates a plan view for a positional relation of the segments 30 which are inserted in the slots 22 of the stator core 21 according to the embodiment. FIG. 2 shows a state prior to joining process being performed by the welding device 10. FIG. 3 illustrates ends of the segments 30 overlapping with each other in a radial direction of the stator core 21 according to the embodiment, when viewed in the radial direction. It should be noted that alternate long and short dash lines in FIGS. 2 and 3 represent directions of the segments 30 extending from the slots 20.

As shown in FIGS. 2 and 3, each of the segments 30 includes an electrical conductor 32, an insulating layer 33 which covers the electrical conductor 32 to provide a circumferential surface thereof with electrical insulation. The electrical conductor is composed of a rectangular wire made of a copper alloy. The insulating layer 33 is composed of soft and electrically insulating material. The insulating layer 33 is stripped at an end 31 of each of the segments 30.

As the alternate long and short dash lines show in FIG. 2, the segments 30 extend from the slots 22 in the circumferential direction. Segments 30 extending from slots 22 which are adjacent to each other in the circumferential direction have the same direction of extension. On the other hand, segments 30 which are adjacent to each other in the radial direction have directions opposite to each other extending from the slots 22, except for segments 30 which are located at a middle portion in the radial direction.

Each of the segments 30 according to the embodiment is configured such that a first portion projecting from a slot 22 extends upward, a second portion following the first portion bends slantwise upward in the circumferential direction, and a third portion following the second portion is twisted to extend further upward (see FIG. 1).

As shown FIG. 3, one end 31 of one segment 30 which extends from one side in the circumferential direction and the other end 31 of the other segment 30 which extends from the other side in the circumferential direction cross each other, and the one end 31 and the other end 31 face each other in the radial direction.

The plurality of ends 31 are arranged in a group of eight pieces to be aligned in a column in the radial direction of the stator core 21, in a state in which the segments 30 are inserted in the stator core 21. A plurality of columns in each of which eight ends 31 of the segments 30 are aligned are arranged to make a radial pattern about an axial center of the stator core 21.

Referring to FIG. 2, pairs of electrical conductors of the segments 30 will be described by assigning ends 31*a* to 31*h* to the ends 31 of the segments 30 in order of outer to inner in the radial direction. The end 31*a* of one segment 30 which is located outermost in the radial direction is joined with the end 31*b* of the other segment 30 which is inside adjacent to the one segment 30 in the radial direction. In addition, the end 31*c* which is located inner (on a middle side) in the radial direction with respect to the end 31*b* is joined with the end 31*d* which is inside adjacent to the end 31*c* in the radial direction. The end 31*h* of one segment 30 which is located innermost in the radial direction is joined with the end 31*g* of the other segment 30 which is outside adjacent to the one segment 30 in the radial direction. In addition, the end 31*f* which is located outer (apart from the middle portion) in the radial direction with respect to the end 31*g* is joined with the end 31*e* which is outside adjacent to the end 31*f* in the radial direction.

To summarize, the ends 31*a* and 31*b*, the ends 31*c* and 31*d*, the ends 31*e* and 31*f*, and the ends 31*g* and 31*h* are joined by welding as pairs of electrical conductors, respectively, among the ends 31 of a group of the segments 30 which are arranged in the radial direction.

Next the welding device 10 which performs welding for the segments 30 will be described. As shown FIG. 1, the welding device 10 according to the embodiment includes a stator tool 11, a welding torch 12, a clamp tool 40 and a pressing device 50.

The stator tool 11 supports rotatably the stator 20 about an axis of the stator 20. The rotation of the stator tool 11 causes the stator 20 to rotate, such that positions of the ends 31 of the segments 30 which are inserted in the stator 20 are variable with respect to the welding torch 12.

The welding torch 12 is supported movably in an upward-downward direction and in a radial direction of the stator 20. The welding torch 12 includes an electrode 121 of a TIG welder and a shield gas outlet 123. TIG welding is used for welding as an example in the embodiment.

Figure 4:
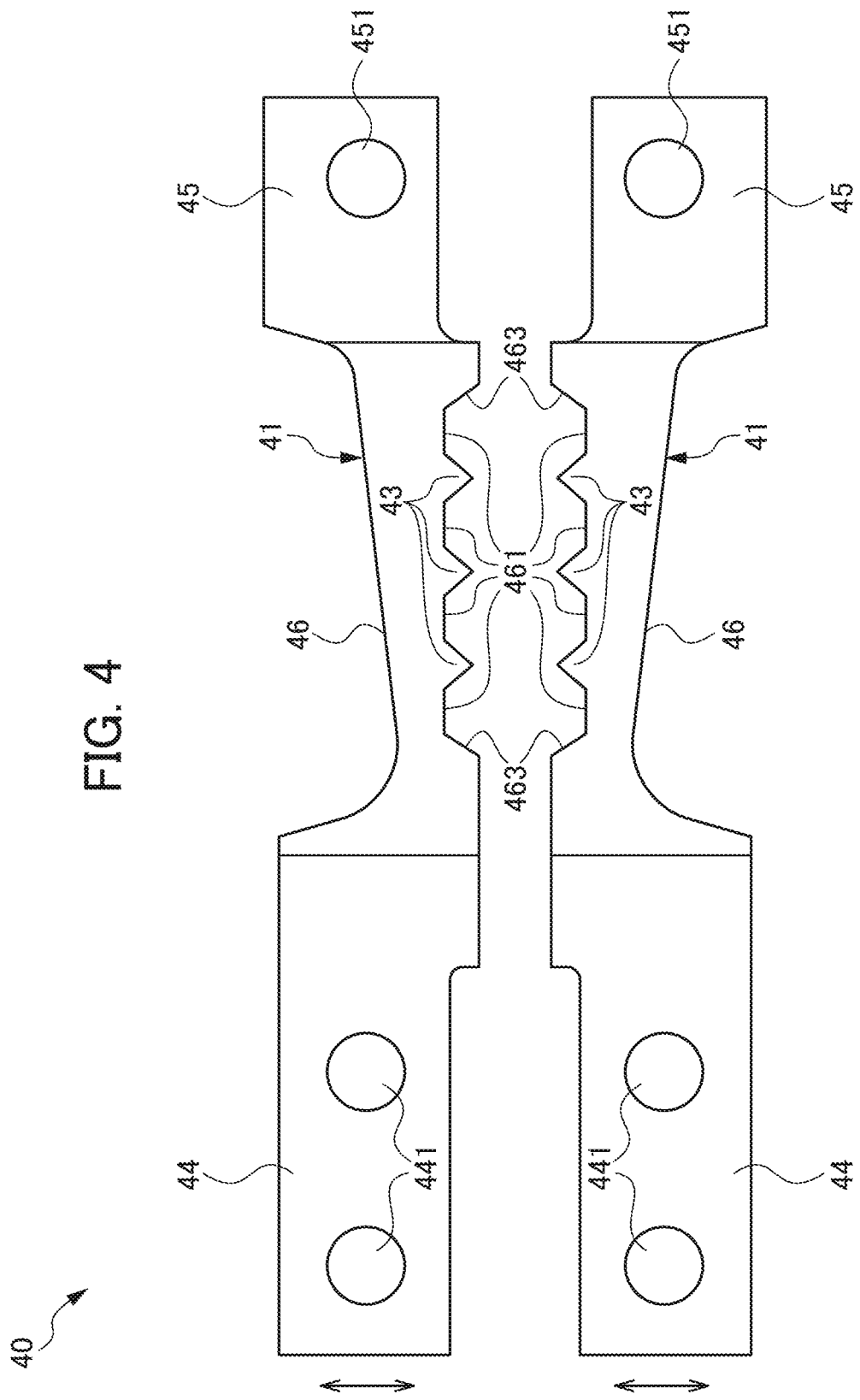
FIG. 4 illustrates a plan view of a clamp tool which is used for joining the segments according to the embodiment.

The clamp tool 40 will be described. FIG. 4 illustrates a plan view of the clamp tool 40 which is used for joining the segments 30 according to the embodiment. The clamp tool 40 is configured to adjust positions of the ends 31 of the segments 30, such that welding is properly performed. The clamp tool 40 includes a left-right pair of clamp main bodies 41. Only one of the clamp main bodies 41 will be described below and the other will not be described repeatedly, since the pair of clamp main bodies 41 of the clamp tool 40 is shaped bilaterally symmetrical.

The clamp main bodies 41 each include an inner support 44, an outer support 45 and a middle clamping portion 46. The inner support 44, the middle clamping portion 46 and the outer support 45, which are arranged in this order and integrally formed of a copper alloy to be one piece, are used for providing a positional reference in the radial direction of the stator core 21.

The inner support 44 which is shaped substantially as a rectangular parallelepiped is provided with two through holes 441 along a longitudinal direction of the inner support 44. Bolts (not shown) pass through the two through holes 441, respectively. Accordingly, the inner support 44 is fixed to a moving device (not shown) of the welding device 10 which supports the clamp tool 40.

The outer support 45 which is shaped substantially as a rectangular parallelepiped is provided with a through hole 451 in the vicinity of an end of the outer support 45 which is opposite to a junction with the middle clamping portion 46. A bolt (not shown) passes through the through hole 451. Accordingly, the outer support 45 is fixed to the moving device (not shown) of the welding device 10 which supports the clamp tool 40.

A pair of middle clamping portions 46 clamps the ends 31 of the segments 30 from both sides in the circumferential direction of the stator core 21. The middle clamping portion 46 includes guiding projections 43 and end accommodation recesses 461.

Three of the guiding projections 43 project from a side wall of one clamp main body 41 to a side wall of the other clamp main body 41 which is opposite to the one main clamp body 41. The three of the guiding projections 43 each have a shape of an isosceles triangle when viewed in a plan view as shown in FIG. 4.

With provision of the guiding projections 43, the end accommodation recesses 461 which are configured to be recessed relatively with respect to the guiding projections 43 are formed at the middle clamping portion 46. The end accommodation recesses 461, which are formed between an adjacent pair among the three of the guiding projections 43 and between two of the three guiding projections 43 which are at both extreme sides and end convex walls 463 provided at both sides of these two guiding projections 43, add up to four recesses which are formed side by side in the radial direction of the stator core 21.

The four of the end accommodation recesses 461 correspond to the pairs of electrical conductors composed of the ends 31a to 31h of the segments 30, respectively. In a state of clamping at a time of a welding operation, a pair of electrical conductors composed of the ends 31a and 31b, a pair of electrical conductors composed of the ends 31c and 31d, a pair of electrical conductors composed of the ends 31e and 31f, and a pair of electrical conductors composed of the ends 31g and 31h of the segments 30 are accommodated by the four of the end accommodation recesses 461, respectively, such that each pair is in a clamped state.

The clamp tool 40 according to the embodiment is supported by the moving device (not shown) as moving means which allows the clamp tool 40 to move in an axial direction of the stator core 21 (the direction shown by an arrow A as shown in FIG. 1 and the opposite direction). The moving device of the welding device 10 includes a clamp tool switcher (not shown) as clamp tool opening and closing means. The moving device (not shown) is configured to cause a pair of the main bodies 41 to depart away from or approach each other in the circumferential direction of the stator core 21, such that the main bodies 41 open or close to clamp the ends 31 of the segments 30 which are inserted in the stator 20.

The pressing device 50 will be described. As shown in FIG. 2, pressing devices 50 are provided at an outer side and an inner side in the radial direction of the stator core 21, respectively. The pressing devices 50 press the segments 30 including the ends 31a to 31h to be welded from outside (from both sides in the radial direction). In this manner, the segments 30 including the ends 31a to 31h turn into a collected state toward the middle portion.

Next, a method for joining the ends 31 of the segments 30 by the welding device 10 will be described. FIG. 5 is a plan view illustrating movements of the segments 30 when welding according to the embodiment is performed. It should be noted that FIG. 5 illustrates a state in which welding has not been performed for the ends of the segments 30.

In the first place, the stator 20 is rotated by rotating the stator tool 11, such that a column of the ends 31a to 31h of the segments 30 to be clamped are moved to a vicinity of the clamp tool 40. The clamp tool 40 is moved to a position where it is possible for the middle clamping portions 46 of the clamp tool 40 to clamp the column of the ends 31 of the segments 30 to be clamped. The clamp main bodies 41 are each disposed between one column of the ends 31a to 31h of the segments 30 to be clamped and other columns of ends 31 of segments 30 which are adjacent to this one column on both sides thereof, among the plurality of columns of the ends 31 of the segments 30 formed in the circumferential direction of the stator core 21.

Subsequently, a pair of the clamp main bodies 41 are drawn closer to each other in a direction shown by an outline arrow by driving the clamp tool switcher (not shown) of the welding device 10. When the clamp main bodies 41 move to a location shown by a two-dot chain line in FIG. 5, eight of the ends 31a to 31h of the segments 30 are accommodated as pairs of electrical conductors in the end accommodation recesses 461, respectively, and subsequently clamped by the clamp main bodies 41.

Four pairs of electrical conductors composed of the ends 31a and 31b, the ends 31c and 31d, the ends 31e and 31f, and the ends 31g and 31h are positioned by the end accommodation recesses 461 and the guiding projections 43 not only in the radial direction of the stator core 21, but also with respect to segments which are adjacent in the circumferential direction of the stator core 21.

The welding torch 12 moves relatively in a direction B as shown in FIG. 1 and welds the four pairs of electrical conductors composed of the ends 31a to 31h of the segments 30 in turn. Welding beads are formed at tips of the ends 31 of the segments 30, accordingly. In this manner, the ends 31a to 31h of the segments 30 arranged in a column in the radial direction are welded to pairs of electrical conductors.

Next, how the ends 31 move will be described, when positions of the ends 31a to 31h of the segments 30 to be welded are corrected by the clamp tool 40. As shown by black arrows in FIG. 5, the ends 31a to 31h move to be close to each other in the radial direction as a result of the positional correction performed by the clamp tool 40. Accompanying the movement of the ends 31a to 31h, a part of segments 30 which include ends 31a-1 to 31h-1 and a part of segments 30 which include ends 31a-2 to 31h-2 move, respectively.

As shown by the outline arrow in FIG. 5, in a group of the segments 30 including the ends 31a-1 to 31h-1, the ends 31a-1, 31c-1 31f-1 and 31h-1 which are each outermost positioned end of an adjacent pair of electrical conductors with respect to the middle portion in the radial direction move to depart away from the middle portion. On the other hand, in a group of the segments 30 including the ends 31a-2 to 31h-2, the ends 31b-2, 31d-2, 31e-2 and 31g-2 which are each innermost positioned end of an adjacent pair of electrical conductors with respect to the middle portion in the radial direction move to approach toward the middle portion.

Movement of the ends 31 which depart from the middle portion in the radial direction are correctable by pressing performed by the pressing devices 50 which press from both inner and outer sides in the radial direction. However, it is difficult to correct dislocations of the ends 31 directed toward the middle portion. In order to cope with the difficulty, the embodiment prevents the ends 31 located at the middle in the radial direction from being dislocated from joining positions by selecting a group of the segments 30 including the ends 31a-1 to 31h-1 which don't move toward the middle portion in the radial direction as a candidate to be welded subsequent to welding the ends 31a to 31h. Even if the ends 31a-1 to 31h-1 move to depart away from the middle portion in the radial direction when the ends 31a to 31h are welded, it is possible that the ends 31a-1 to 31h-1 are corrected to proper joining positions by the pressing devices 50.

After welding the group of the segments 30 including the ends 31a to 31h, the stator 20 is rotated by the stator tool 11, such that the group of the segments 30 including the ends 31a-1 to 31h-1 are located at welding positions (clamping positions). Two of the eight ends 31 are arc welded at a time by TIG welding. With the repetition of welding in turn, the electrical continuity is established for each pair of the ends 31 of the segments 30. It should be noted that since some parts of the group of the segments 30 which include the ends 31a-2 to 31h-2 move to depart from the middle portion in the radial direction ultimately, it is possible to finish the welding operation by performing welding for these segments 30 at the proper joining positions.

The embodiment described above provides advantages as shown below. The present invention provides the method for joining the segments 30. The segments 30, which are inserted in the slots 22 provided at the stator core 21, are twisted. Two of the segments 30, which extend in the circumferential direction from two of the slots 22 different from each other and whose ends 31 are adjacent to each other in the radial direction, are joined as a pair of electrical conductors by welding while the two of the electrical conductors are being pressed from both sides in the radial direction. The method for joining the segments (electrical conductors) 30 comprises the first joining step and the second joining step. The first joining step includes welding the group of the segments 30 (the first group of the electrical conductors) including the ends 31a to 31h which are composed of the segments 30 whose ends 31 are arranged in a column in the radial direction, such that the first group of the electrical conductors are welded to pairs of electrical conductors. The second joining step which is performed subsequent to the first joining step includes welding the second group of the segments 30 including ends 31a-1 to 31h-1 which are composed of the segments 30 whose ends 31 are arranged in a column in the radial direction, such that the second group of the electrical conductors are welded to pairs of electrical conductors. The first group includes a segment 30 as a first electrical conductor including the end 31d (a segment 30 including the end 31e) which is located at the middle portion of the group of the segments 30 including the ends 31a to 31h in the radial direction. The second group includes a segment 30 as a second electrical conductor including the end 31c-1 (a segment 30 including the end 31f-1) which crosses the first electrical conductor on the opposite sides with respect to the middle portion in the radial direction.

In this manner, the segment 30 including the end 31c-1 which crosses the segment 30 including the end 30d and the segment 30 including the end 31f-1 which crosses the segment 30 including the end 30e will not move toward the middle portion in the radial direction, even if the ends 31d and 31e which are located at the middle portion among the group of the segments 30 including the ends 31a to 31h move during the welding operation. It is possible to correct effectively a joining defect due to the ends 31d-1 and 31e-1 which are located at the middle portion in radial direction and dislocated from the joining positions (clamp positions), since it is possible to restrain the ends 31d-1 and 31e-1 of the segments 30 from moving, which are located at the middle portion in the radial direction where it is difficult to perform positional correction by pressing applied from outside.

In addition, two segments 30 constituting a pair of electrical conductors extend to be close to each other as far as the joining position from positions which are away from each other in the circumferential direction. The group of the segments 30 having the ends 31a-1 to 31h-1 includes the segments 30 having the ends 31a-1, 31c-1, 31f-1 and 31h-1 which cross the segments 30 having the ends 31b, 31d, 31e and 31g on opposite sides with respect to the middle portion in the radial direction, among the pairs of electrical conductors constituting the group of the segments 30 having the ends 31a to 31h.

Accordingly, it is possible to prevent the ends of the segments 30 securely from being dislocated from the joining positions toward the middle portion in the radial direction for a case where the segments 30 are arranged alternately.

While the invention has been described in terms of an exemplary embodiment, it should be understood that the invention is not limited to the exemplary embodiment described above, but can include modifications. For example, two segments 30 which extend from the slots 22 in the same direction and ends 31 of which are arranged to be adjacent to each other in the radial direction may alternatively be adopted as a pair of electrical conductors, and included as part of the group of the segments 30.

In addition, while the invention has been described in terms of an exemplary embodiment in which TIG welding is adopted as a method of welding and the welding torch 12 is provided with an electrode and a shield gas outlet of TIG welding, the invention is not limited to the embodiment. For example, MIG welding may be alternatively adopted, and other methods of welding may also be adopted if it is possible to weld the ends 31 of the segments 30. In addition, electrical insulators may be inserted in the slots 22 and the segments 30 may be inserted in the electrical insulators.

What is claimed is:
1. A method for joining a plurality of electrical conductors which are inserted in a plurality of slots provided at a core and which are twisted,
  two of the electrical conductors, whose ends are adjacent to each other in a radial direction of the core and which extend in a circumferential direction of the core from two of the slots different from each other, being joined as a pair of electrical conductors by welding while the two of the electrical conductors are pressed from both sides in the radial direction, the method comprising:

a first joining step to weld a first group of the electrical conductors, the first group of the electrical conductors having ends arranged in a column in the radial direction, such that the first group of the electrical conductors are welded to pairs of electrical conductors, a second joining step, which is subsequent to the first joining step, to weld a second group of the electrical conductors, the second group of the electrical conductors having ends arranged in a column in the radial direction, such that the second group of the electrical conductors are welded to pairs of electrical conductors, wherein the first group includes first electrical conductors which are located at a middle portion of the first group with respect to the radial direction, and the second group includes second electrical conductors which cross the first electrical conductors on opposite sides with respect to the middle portion.

2. The method for joining a plurality of electrical conductors according to claim 1, wherein the two of the electrical conductors constituting the pair of electrical conductors are configured to extend to be close to each other at a joining position from locations apart from each other in the circumferential direction, the second group includes the second electrical conductors which cross the first electrical conductors on the opposite sides with respect to the middle portion in the radial direction, the first electrical conductors being located at the middle portion with respect to the radial direction among the pairs of electrical conductors constituting the first group.

* * * * *